United States Patent [19]
Mistutake

[11] Patent Number: 5,648,870
[45] Date of Patent: Jul. 15, 1997

[54] DICHROIC MIRROR AND PROJECTOR HAVING THE SAME

[75] Inventor: Hideaki Mistutake, Tokyo, Japan

[73] Assignee: Canon Kabushiki Kaisha, Tokyo, Japan

[21] Appl. No.: 291,343

[22] Filed: Aug. 16, 1994

Related U.S. Application Data

[63] Continuation of Ser. No. 735,283, Jul. 24, 1991, abandoned.

[30] Foreign Application Priority Data

Jul. 26, 1990 [JP] Japan ................................. 2-196370
Feb. 19, 1991 [JP] Japan ................................. 3-45424

[51] Int. Cl.⁶ ............................. G02B 5/28; G02B 5/30; G02B 27/28
[52] U.S. Cl. ..................... 359/487; 359/490; 359/496; 359/498; 359/583; 359/589; 359/634; 353/20
[58] Field of Search ........................... 359/487, 490, 359/491, 492, 494, 495, 496, 497, 498, 499, 502, 583, 589, 634; 353/20, 30

[56] References Cited

U.S. PATENT DOCUMENTS 2,184,999  12/1939  Land et al. ............................. 359/498
3,767,290  10/1973  Lang et al. ............................. 359/490
4,627,688  12/1986  Kobayashi et al. .................... 359/589
4,806,750   2/1989  Vincent .................................. 359/589

FOREIGN PATENT DOCUMENTS 359461   3/1990  European Pat. Off. .
848716  12/1951  Germany .

Primary Examiner—Ricky D. Shafer
Attorney, Agent, or Firm—Morgan & Finnegan LLP

[57] ABSTRACT

A dichroic mirror for reflecting a beam of a given color includes a substrate and a multilayered film formed on the substrate. The multilayered film is constituted by a first dichroic reflecting layer, an intermediate layer, and a second dichroic reflecting layer sequentially from the beam incident side. The first dichroic reflecting layer has a smaller reflection range of one of two orthogonal polarized components of the beam than the other of the two orthogonal polarized components. The intermediate layer rotates a polarization plane of at least part of a beam of the one component of the beam passing through the first dichroic reflecting layer, and the second dichroic reflecting layer reflects the at least part of the beam whose polarization plane is rotated by the intermediate layer. A projector having the dichroic mirror is also disclosed.

44 Claims, 9 Drawing Sheets

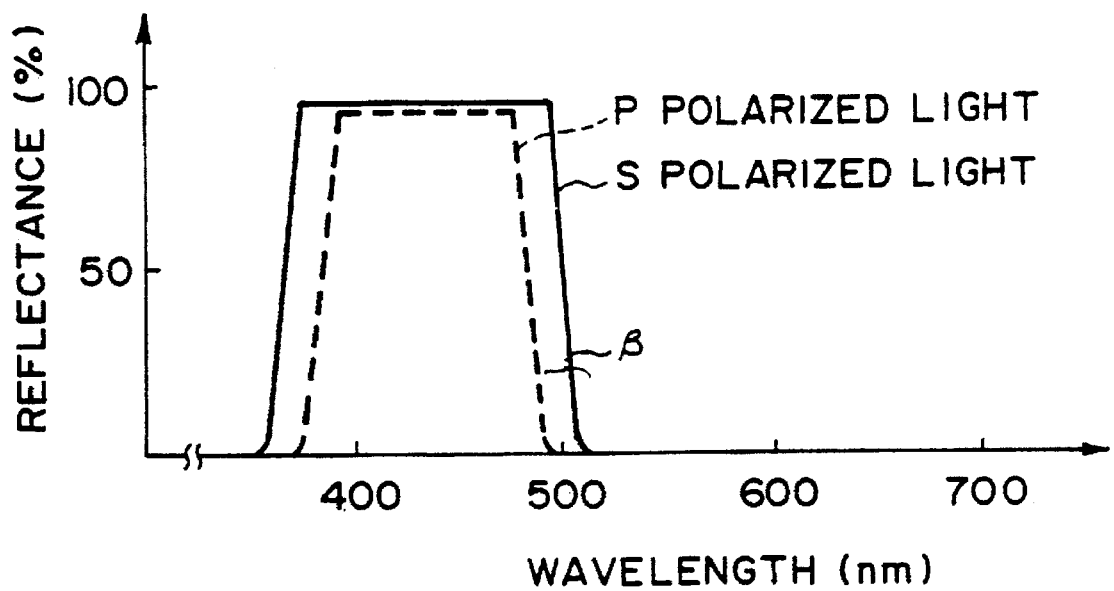
F I G. 5A
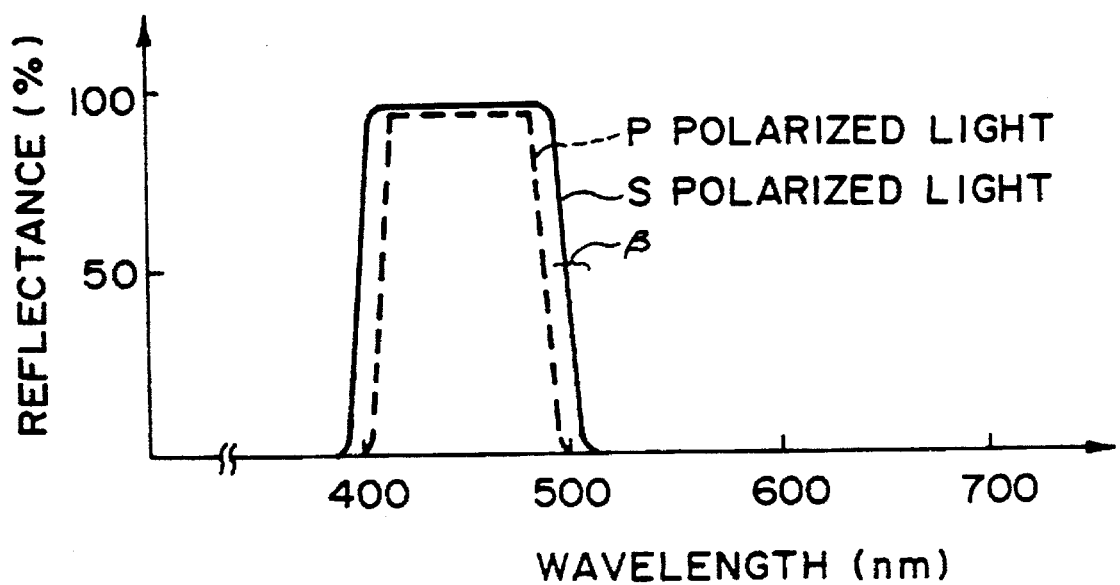
F I G. 5B

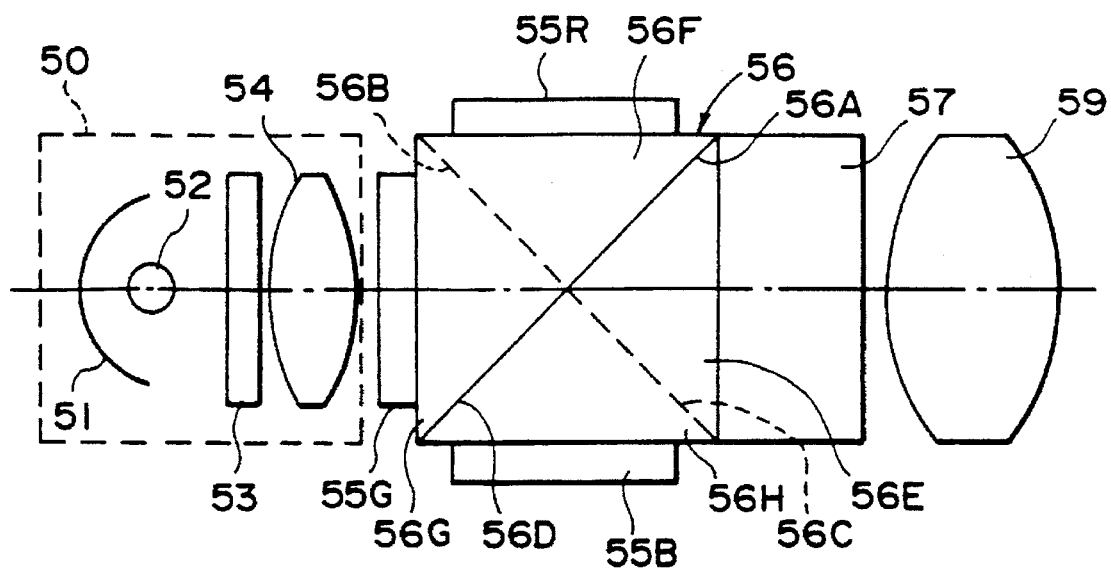
F I G. 9
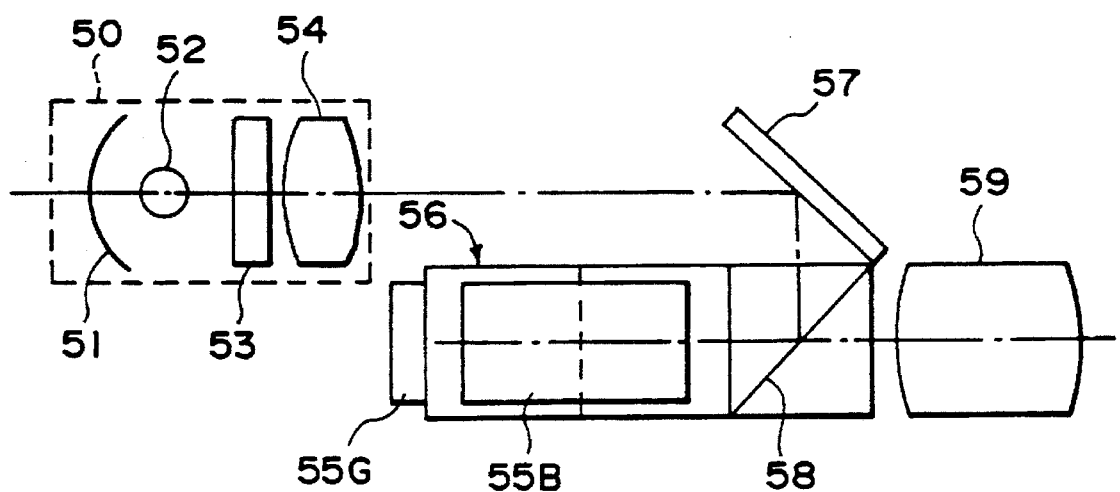
F I G. 10

DICHROIC MIRROR AND PROJECTOR HAVING THE SAME

This is a continuation of application Ser. No. 07/735,283, filed on Jul. 24, 1991 now abandoned.

BACKGROUND OF THE INVENTION

1. Field of the Invention

The present invention relates to a dichroic mirror and a projector having the same.

2. Related Background Art

A conventional dichroic mirror is shown in a schematic view of FIG. 1. A detailed arrangement of this projector is described in Japanese Laid-Open Patent Application No. 61-13885.

As shown in FIG. 1, a polarizing beam splitter 83 is arranged on the output side of white light emitted from a light source 82. First and second dichroic mirrors 84 and 85 are formed at bonding surfaces each obtained by bonding two rectangular prisms and are sequentially arranged in a direction (left direction) opposite to that of light reflected by the polarizing beam splitter 83. The first and second dichroic mirror 84 and 85 separate the white light into red light, green light, and blue light, radiate these light beams on first to third reflection liquid crystal panels 81R, 81G, and 81B for forming red, green, and blue images, respectively, and synthesize image light beams of the respective colors emerging from the liquid crystal panels 81R, 81G, and 81B. The image light beams synthesized by the first and second dichroic mirrors 84 and 85 are enlarged and projected on a screen (not shown) through a projection lens 86.

The liquid crystal panels 81R, 81G, and 81B often comprise ECB (Electrically Controlled Birefringence) panels each having characteristics for partially rotating a polarization plane of incident light (S-polarized component in this example) through 90° upon application of a voltage to a liquid crystal layer in accordance with the corresponding color image signal.

In a liquid crystal projection display apparatus having an arrangement described above, only the S-polarized component of the white light emitted from the light source 82 is reflected perpendicularly to the left of FIG. 1 by the polarizing beam splitter 83. The white light of reflected S-polarized light is separated into red light, green light, and blue light by the first and second dichroic mirrors 84 and 85. These light beams are then incident on the corresponding liquid crystal panels 81R, 81G, and 81B.

The polarization planes of the image light beams of the respective colors from the liquid crystal panels 81R, 81G, and 81B are rotated in accordance with image signals of the respective pixels and, therefore, the output image light includes S- and P-polarized light components. The light beams of the respective colors are synthesized by the first and second dichroic mirrors 84 and 85, and the synthesized light is incident on the polarizing beam splitter 83.

The P-polarized components of the light beams of the respective colors are transmitted through the polarizing beam splitter 83 and are projected on a screen (not shown) through the projection lens 86. On the other hand, the S-polarized components of the light beams of the respective colors are reflected perpendicularly downward by the polarizing beam splitter 83 and return to the direction of the light source 82. That is, the polarizing beam splitter 83 serves as both a polarizer and an analyzer for the liquid crystal panels 81R, 81G, and 81B. In this projection display apparatus, polarizing plates for eliminating the S-polarized components of the respective color components are not required for the liquid crystal panels 81R, 81G, and 81B.

The above conventional apparatus, however, has the following drawbacks.

A light beam in the blue light wavelength range is taken as an example. The dichroic mirrors 84 and 85 serving as the color separating/synthesizing means for performing color separation and synthesis of white light have a wider reflected S-polarized component wavelength range than the reflected P-polarized component wavelength range and therefore their reflection characteristics have polarization dependency, as shown in FIG. 2. As in the liquid crystal projection display apparatus shown in FIG. 1, when the light beams incident on the liquid crystal panels 81R, 81G, and 81B include S-polarized components and the image light beams of the respective colors emerging from the liquid crystal panels 81R, 81G, and 81B include P-polarized components, parts of the image light beams of the respective colors are lost due to the polarization dependency of reflection characteristics of the dichroic mirrors 84 and 85. For this reason, brightness and contrast levels are undesirably decreased, and a clear image cannot be projected on the screen.

SUMMARY OF THE INVENTION

It is an object of the present invention to provide a dichroic mirror having small polarization dependency and an optical apparatus such as a projector having this mirror.

According to the first aspect of the present invention, there is provided a dichroic mirror having a multilayered film for reflecting a beam of a given color, the multilayered film being constituted by a first reflecting layer consisting of a dielectric multilayered film, an intermediate layer consisting of a halfwave plate, and a second reflecting layer consisting of a dielectric multilayered film in the order named from the beam incident side.

According to the second aspect of the present invention, there is provided a dichroic mirror having a multilayered film for reflecting a beam of a given color, the multilayered film being constituted by a first reflecting layer consisting of a dielectric multilayered film, an intermediate layer consisting of a halfwave plate, a second reflecting layer consisting of a dielectric multilayered film, and an auxiliary layer consisting of a halfwave plate and having a low-index axis parallel to a high-index axis of the intermediate layer in the order named from the beam incident side.

According to the third aspect of the present invention, there is provided a dichroic mirror having a multilayered film for reflecting a polarized beam of a given color and transmitting a polarized beam of a color different from the given color, the multilayered film being constituted by a first reflecting layer consisting of a dielectric multilayered film, an intermediate layer consisting of a halfwave plate, a second reflecting layer consisting of a dielectric multilayered film, and an auxiliary layer consisting of a halfwave plate in the order named from the incident side of the beam of the given color, the auxiliary layer having a low-index axis parallel to a high-index axis of the intermediate layer and substantially compensating for a change in a polarization plane of the polarized beam of the color different from the given color, and the change occurring in the intermediate layer.

According to the fourth aspect of the present invention, there is provided a dichroic mirror for reflecting a beam of a given color, comprising a substrate and a multilayered film formed on the substrate, the multilayered film being constituted by a first dichroic reflecting layer, an intermediate layer, and a second dichroic reflecting layer in the order named from the beam incident side, the first dichroic reflecting layer having a smaller reflection range of one of two orthogonal polarized components of the beam than the other of the two orthogonal polarized components, the intermediate layer rotating a polarization plane of at least part of a beam of the one component of the beam passing through the first dichroic reflecting layer, and the second dichroic reflecting layer reflecting the at least part of the beam whose polarization plane is rotated by the intermediate layer. In the second dichroic reflecting layer in this mirror, characteristics of at least one end of a long- and short-wavelength sides of the reflection range for the other component of the beam are similar to those of the reflection range of the other component in the first dichroic reflecting layer.

According to the fifth aspect of the present invention, there is provided a dichroic mirror for reflecting a red beam, comprising a substrate and a multilayered film formed on the substrate, the multilayered film being constituted by a first dichroic reflecting layer, an intermediate layer, and a second dichroic reflecting layer in the order named from the incident side of the red beam, the first dichroic reflecting layer having a smaller reflection range of a P-polarized component of the beam than that of an S-polarized component thereof, the intermediate layer rotating, through substantially 90°, at least part of a beam of the P-polarized component of the beam passing through the first dichroic reflecting layer, the second dichroic reflecting layer having short-wavelength characteristics of the reflection range of the S-polarized component of the red beam to be almost equal to short-wavelength characteristics of the reflection range of the S-polarized component in the first dichroic reflecting layer, and the second dichroic reflecting layer reflecting the at least part of the beam whose polarization plane is rotated by the intermediate layer.

According to the sixth aspect of the present invention, there is provided a dichroic mirror for reflecting a blue beam, comprising a substrate and a multilayered film formed on the substrate, the multilayered film being constituted by a first dichroic reflecting layer, an intermediate layer, and a second dichroic reflecting layer in the order named from the incident side of the blue beam, the first dichroic reflecting layer having a smaller reflection range of a P-polarized component of the beam than that of an S-polarized component thereof, the intermediate layer rotating, through substantially 90°, at least part of a beam of the P-polarized component of the beam passing through the first dichroic reflecting layer, the second dichroic reflecting layer having long-wavelength characteristics of the reflection range of the S-polarized component of the blue beam to be almost equal to long-wavelength characteristics of the reflection range of the S-polarized component in the first dichroic reflecting layer, and the second dichroic reflecting layer reflecting the at least part of the beam whose polarization plane is rotated by the intermediate layer.

According to the seventh aspect of the present invention, there is provided a dichroic mirror for reflecting a green beam, comprising a substrate and a multilayered film formed on the substrate, the multilayered film being constituted by a first dichroic reflecting layer, an intermediate layer, and a second dichroic reflecting layer in the order named from the incident side of the green beam, the first dichroic reflecting layer having a smaller reflection range of a P-polarized component of the beam than that of an S-polarized component thereof, the intermediate layer rotating, through substantially 90°, at least part of a beam of the P-polarized component of the beam passing through the first dichroic reflecting layer, the second dichroic reflecting layer having long- and short-wavelength characteristics of the reflection range of the S-polarized component of the green beam to be almost equal to long- and short-wavelength characteristics of the reflection range of the S-polarized component in the first dichroic reflecting layer, and the second dichroic reflecting layer reflecting the at least part of the beam whose polarization plane is rotated by the intermediate layer.

According to the eighth aspect of the present invention, there is provided an optical apparatus having a color separation system, the color separation system receiving first and second beams having different colors, the system comprising a dichroic mirror for reflecting the first beam and transmitting the second beam to separate the first beam from the second beam, the mirror having a first dichroic reflecting layer, an intermediate layer, and a second dichroic reflecting layer in the order named from the incident side of each of the first and second beams, the first dichroic reflecting layer having a smaller reflection range of one of two orthogonal polarized components of the first beam than that of the other of the two orthogonal polarized components, the intermediate layer rotating a polarization plane of at least part of a remaining beam of the one component of the first beam passing through the first dichroic reflecting layer, and the second dichroic reflecting layer reflecting the at least part of the beam whose polarization plane is rotated by the intermediate layer.

According to the ninth aspect of the present invention, there is provided an optical apparatus having a color synthesis system, the color synthesis system receiving first and second beams having different colors, the system comprising a dichroic mirror for reflecting the first beam and transmitting the second beam to separate the first beam from the second beam, the mirror having a first dichroic reflecting layer, an intermediate layer, and a second dichroic reflecting layer in the order named from the incident side of each of the first and second beams, the first dichroic reflecting layer having a smaller reflection range of one of two orthogonal polarized components of the first beam than that of the other of the two orthogonal polarized components, the intermediate layer rotating a polarization plane of at least part of a remaining beam of the one component of the first beam passing through the first dichroic reflecting layer, and the second dichroic reflecting layer reflecting the at least part of the beam whose polarization plane is rotated by the intermediate layer.

According to the tenth aspect of the present invention, there is provided a projector comprising radiation beam supply means for supplying a radiation beam including first and second beams having different colors, and a color separation system for separating the radiation beam into the first and second beams, the color separation system having a dichroic mirror, the mirror having a first dichroic reflecting layer, an intermediate layer, and a second dichroic reflecting layer in the order named from the incident side of each beam to reflect the first beam and transmit the second beam so as to separate the first beam from the second beam. The first dichroic reflecting layer has a smaller reflection range of one of two orthogonal polarized components of the first beam than that of the other of the two orthogonal polarized components. The intermediate layer rotates a polarization plane of at least part of a remaining beam of the one component of the first beam passing through the first dichroic reflecting layer, and the second dichroic reflecting layer reflects the at least part of the beam whose polarization plane is rotated by the intermediate layer. The projector further comprises means for modulating the first beam from the color separation system and generating a first image, means for modulating the second beam from the color separation system and generating a second image, and means for projecting the first and second images.

According to the eleventh aspect of the present invention, there is provided a projector comprising supply means for supplying first and second beams having different colors, first beam generating means for modulating the first beam from the supply means and generating a beam representing a first image, second beam generating means for modulating the second beam from the supply means and generating a beam representing the second image, and a color synthesis system for synthesizing the beams representing the first and second images, the system having a dichroic mirror, and the mirror having a first dichroic reflecting layer, an intermediate layer, and a second dichroic reflecting layer in the order named from the incident side of the first beam to reflect the beam representing the first image and transmit the beam representing the second image to synthesize the beam representing the first image with the beam representing the second image. The first dichroic reflecting layer has a smaller reflection range of one of two orthogonal polarized components of the first beam than that of the other of the two orthogonal polarized components, the intermediate layer rotates a polarization plane of at least part of a remaining beam of the one component of the first beam passing through the first dichroic reflecting layer, and the second dichroic reflecting layer reflects the at least part of the beam whose polarization plane is rotated by the intermediate layer. The projector further comprises means for projecting the first and second images by using the beams representing the first and second images from the color synthesis system.

According to the twelfth aspect of the present invention, there is provided a projector comprising radiation beam supply means for supplying a radiation beam including first and second beams having different colors, a first image generator for reflecting and modulating the first beam and generating a first image, a second image generator for reflecting and modulating the second beam and generating a second image, and an optical system for separating the radiation beam into the first and second beams and directing the first and second beams toward the first and second image generators, and for synthesizing the first and second beams reflected and modulated by the first and second image generators, the system having a dichroic mirror, and the mirror having a first dichroic reflecting layer, an intermediate layer, and a second dichroic reflecting layer in the order named from the side of the supply means to reflect the first beam and transmit the second beam. The first dichroic reflecting layer has a smaller reflection range of one of two orthogonal polarized components of the first beam than the other of the two orthogonal polarized components, the intermediate layer rotates a polarization plane of at least part of a remaining beam of the one component of the first beam passing through the first dichroic reflecting layer, and the second dichroic reflecting layer reflects the at least part of the beam whose polarization plane is rotated by the intermediate layer. The projector further comprises means for receiving through the optical system the first and second beams reflected and modulated by the first and second image generators and projecting the first and second images by using the first and second beams.

BRIEF DESCRIPTION OF THE DRAWINGS

FIGS. 5A and 5B are graphs showing reflection characteristics of a first dichroic optical multilayered film shown in FIG. 4 and a second dichroic optical multilayered film shown in FIG. 4, respectively;

FIG. 9 is a plan view of the first embodiment of a projection display apparatus according to the present invention;

FIG. 10 is a side view of the projection display apparatus shown in FIG. 7;

DETAILED DESCRIPTION OF THE PREFERRED EMBODIMENTS

Figure 1:
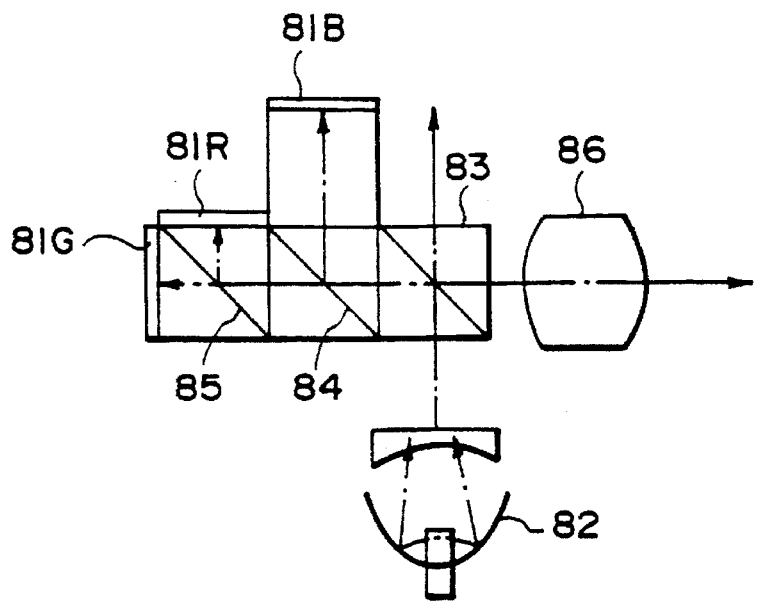
FIGS. 1 and 2 are a schematic view and a graph, respectively, showing a conventional projector having a dichroic mirror.
Figure 2:
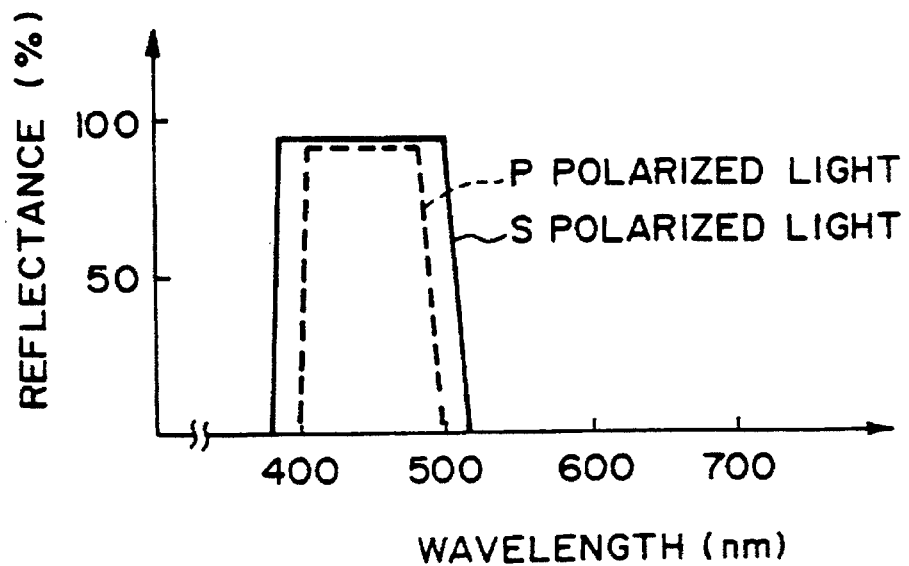

A dichroic mirror to be described with reference to each embodiment thereof has dichroic mirror surfaces constituted by interposing a first halfwave plate between first and second dichroic optical multilayered films, the first and second dichroic optical multilayered films having equal reflection characteristics for S-polarized components in an edge wavelength range of at least one end side of a predetermined visible light range, or additionally has a second halfwave plate adhered to a surface of the first or second dichroic optical multilayered film at a position opposite to the first halfwave plate. In this case, the high- and low-index axes of the first and second halfwave plates have opposite directions. That is, the high-index axis of one halfwave plate has the same direction as the low-index axis of the other halfwave plate.

The dichroic mirror surface may be formed at a bonding surface of two 45° rectangular prisms.

The dichroic mirror surfaces may be formed at bonding surfaces of four 45° rectangular prisms when these prisms are bonded to each other such that their 90° vertices constitute the center.

A transparent flat plate may be adhered to at least one of the dichroic mirror surfaces.

Note that the optical multilayered films of the dichroic mirror surfaces consist of a dielectric material and the halfwave plate has a birefringence.

A projection display apparatus to be described in each embodiment thereof comprises a light source for emitting white light, reflection liquid crystal devices for rotating polarization planes of red, green, and blue beams in accordance with red, green, and blue components of an image signal and converting the red, green, and blue beams into red, green, and blue image beams, and color separating/synthesizing means for separating the white light into the red, green, and blue beams and causing the red, green, and blue beams to be incident on the reflection liquid crystal devices, respectively, and for synthesizing the red, green, and blue image beams, wherein the color separating/synthesizing means comprises dichroic mirrors.

In these dichroic mirrors, incident light is incident on the first dichroic optical multilayered film and is separated into reflected color light and transmitted color light. The polarization plane of the transmitted color light is rotated through 90° by the first halfwave plate. The rotated color light is incident on the second dichroic optical multilayered film.

If the incident light is an S-polarized component, the incident light is reflected in almost the full-wavelength range of the reflected color light (i.e., a predetermined visible range). On the other hand, when the incident light is a P-polarized component, since the reflection wavelength range of the first dichroic optical multilayered film for the P-polarized component is smaller than that for the S-polarized component, reflection in almost the full-wavelength range of the reflected color light does not occur. More specifically, a color beam in an edge range of at least one end of the reflected color light passes through the first dichroic optical multilayered film. The transmitted color light beam is converted into an S-polarized component through the first halfwave plate and is reflected by the second dichroic optical multilayered film. The reflected light beam is converted into a P-polarized component again through the first halfwave plate and is output.

Even if the incident light is a P-polarized component, reflection in almost the full-wavelength range can be performed as in an S-polarized component.

When the second halfwave plate is added and the high- and low-index axes of the first and second halfwave plates have opposite directions, the polarization plane of the transmitted color light emerging from the dichroic mirror can be set to be identical to the polarization plane of the incident light, thereby performing phase compensation of the transmitted color light.

In the projection display apparatus having the above dichroic mirrors, since the color separating/synthesizing means can be constituted by the above dichroic mirrors, utilization efficiency of the white light can be increased.

The dichroic mirror is constituted by a crossed dichroic prism obtained by adhering four 45° rectangular prisms, and the distance (back focal length) between each reflection liquid crystal device and the projection lens can be shortened.

Embodiments of the present invention will be described with reference to the accompanying drawings.

Figure 3:
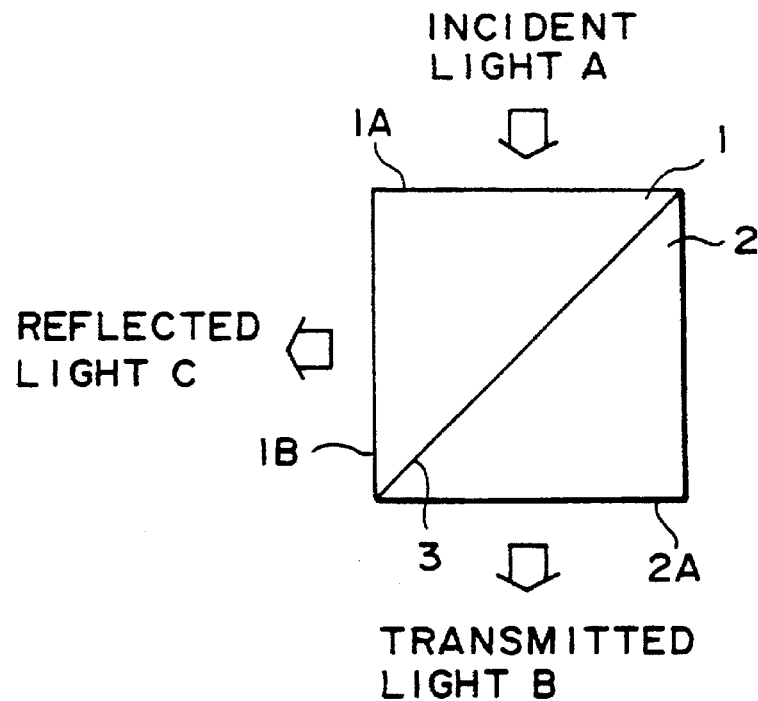
FIG. 3 is a schematic view showing the first embodiment of a dichroic mirror according to the present invention.

FIG. 3 is a schematic view showing the first embodiment of a dichroic mirror according to the present invention.

This dichroic mirror is generally called a dichroic prism (to be referred to as a dichroic prism hereinafter). A blue light reflection dichroic mirror surface (not shown) for reflecting a blue beam having a wavelength of about 400 nm to about 500 nm and transmitting red and green beams each having a wavelength of about 500 nm or more is formed at a bonding surface 3 obtained such that first and second 45° rectangular prisms 1 and 2 made of glass or a plastic are adhered at their long side surfaces.

Figure 4:
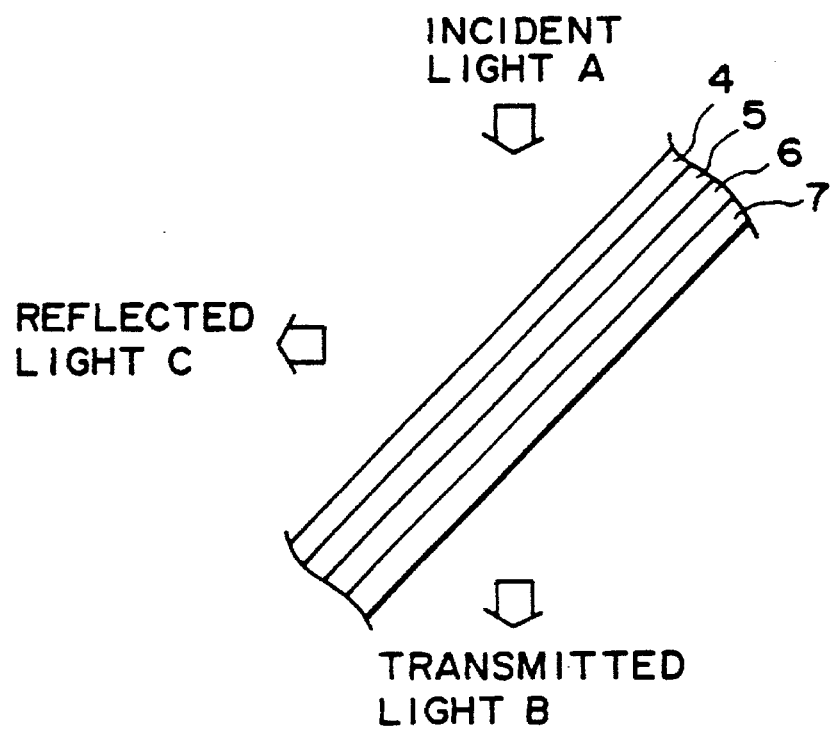
FIG. 4 is a view showing a structure of a dichroic mirror surface as a bonding surface shown in FIG. 3.

As shown in FIG. 4, the dichroic mirror surface is constituted by a multilayered structure obtained such that a first dichroic optical multilayered film 4 for reflecting blue light, a first halfwave plate 5, a second dichroic optical multilayered film 6 for reflecting blue light, and a second halfwave plate 7 are stacked on each other from the side of the first rectangular prism 1.

FIGS. 5A and 5B are graphs showing reflection characteristics of the first and second dichroic optical multilayered films 4 and 6, respectively.

As shown in FIG. 5A, the first dichroic optical multilayered film 4 has reflection characteristics defined such that a reflection wavelength range for an S-polarized component is about 150 nm (reflection of an S-polarized component having a wavelength of about 350 to about 500 nm) and a reflection wavelength range for a P-polarized component is about 100 nm (reflection of a P-polarized component having a wavelength of about 380 nm to about 480 nm). As shown in FIG. 5B, the second dichroic optical multilayered film 6 has reflection characteristics defined such that a reflection wavelength range for an S-polarized component is about 100 nm (reflection of an S-polarized component having a wavelength of about 400 to about 500 nm) and a reflection wavelength range for a P-polarized component is about 80 nm (reflection of a P-polarized component having a wavelength of about 410 nm to about 490 nm).

The reflection characteristics of the first and second dichroic optical multilayered films 4 and 6 have the following features.

(1) In the first and second dichroic optical multilayered films 4 and 6, the reflection wavelength range for the S-polarized component is larger than that for the P-polarized component.

(2) In the first dichroic optical multilayered film 4, the reflection wavelength ranges for the S- and P-polarized components are larger than those in the second dichroic optical multilayered film 6.

(3) The reflection characteristics for the S-polarized component in a long-wavelength edge range β (near the range having the wavelength of 500 nm), i.e., an edge range of at least one end of a predetermined visible range, of the blue light range in the first dichroic optical multilayered film 4 are equal to those in the second dichroic optical multilayered film 6.

(4) The wavelength (about 500 nm) at the long-wavelength end of the reflection wavelength range for the S-polarized component in the second dichroic optical multilayered film 6 is larger than that (about 480 nm) of the long-wavelength end of the reflection wavelength range for the P-polarized component in the first dichroic optical multilayered film 4.

An operation of this dichroic prism will be described below.

Assume that incident light A shown in FIG. 3 is white light of an S-polarized component (i.e., a polarized component parallel to the bonding surface 3) incident on this dichroic prism.

The white light (incident light A) incident on an incident surface 1A of the first rectangular prism 1 propagates straight through the first rectangular prism 1 and is incident on the first dichroic optical multilayered film 4.

Since the white light is the S-polarized component for this dichroic prism, blue light having the wavelength of about 350 nm to about 500 nm is reflected by the first dichroic optical multilayered film 4 perpendicularly to the left in FIG. 4. The reflected light serves as reflected light C and emerges from an exit surface 1B of the first rectangular prism 1.

Of all the components of the white light described above, components (i.e., green and red light beams) having a wavelength of about 500 nm or more pass through the first dichroic optical multilayered film 4 and are incident on the first halfwave plate 5. These beams pass through the first halfwave plate 5 and are converted into P-polarized components. These P-polarized components are incident on the second dichroic optical multilayered film 6 (FIG. 4). Since the reflection wavelength range of the second dichroic optical multilayered film 6 for the P-polarized component is about 410 nm to about 490 nm (broken line in FIG. 5B), the light converted into the P-polarized component passes through the second dichroic optical multilayered film 6 and is incident on the second halfwave plate 7. This component passes through the second halfwave plate 7 and is polarized into an S-polarized component. The S-polarized component emerges as transmitted light B from an exit surface 2A of the second rectangular prism 2.

Assume that the incident light A in FIG. 3 is white light of a P-polarized component (i.e., light having only polarized components perpendicular to the bonding surface 3) incident on this dichroic prism.

The white light (incident light A) incident on the incident surface 1A of the first rectangular prism 1 propagates straight through the first rectangular prism 1 and is incident on the first dichroic optical multilayered film 4.

Since this white light is a P-polarized component for this dichroic prism, of all the components of the white light, a blue light beam having a wavelength of about 380 nm to about 480 nm is reflected by the first dichroic optical multilayered film 4 perpendicularly to the left in FIG. 4 and serves as reflected light C. The reflected light C emerges from the exit surface 1B of the first rectangular prism 1.

On the other hand, of all the components of the white light, components (i.e., some blue light beams, and all green and red light beams) pass through the first dichroic optical multilayered film 4 and are incident on the first halfwave plate 5. These components pass through the first halfwave plate 5 and are converted into S-polarized components. These components are incident on the second dichroic optical multilayered film 6. The reflection wavelength range of the second dichroic optical multilayered film 6 for the S-polarized component is about 400 nm to about 500 nm (solid line in FIG. 5B). Of all the S-polarized components, the blue light beam having a wavelength of about 480 nm to about 500 nm is reflected by the second dichroic optical multilayered film 6 perpendicularly to the left in FIG. 4 and passes through the first halfwave plate 5, thus obtaining a P-polarized component. This component serves as the reflected light C and emerges from the exit surface 1B of the first rectangular prism 1. Components (i.e., green and red light beams) having a wavelength of about 500 nm or more pass through the second dichroic optical multilayered film 6 and are incident on the second halfwave plate 7. The components pass through the second halfwave plate 7 and converted into the P-polarized components. These components emerge as the transmitted light B from the exit surface 2A of the second rectangular prism 2.

When the incident light A is white light of the P-polarized component for this dichroic prism, the first dichroic mirror surface 84 used in the conventional projection display apparatus shown in FIG. 1 can obtain the reflected light C from the blue light beams having wavelengths up to about 480 nm. However, in the dichroic prism of this embodiment, blue light beams having wavelengths up to about 500 nm can be obtained as the reflected light C in the same manner as in the case wherein the white light is the S-polarized component for this dichroic prism. Therefore, utilization efficiency of the white light (incident light A) can be improved by eliminating polarization dependency.

As shown in FIGS. 5A and 5B, the first and second dichroic optical multilayered films 4 and 6 themselves may have polarization dependency. A general multilayered structure manufactured by a known method can be used for these films. The reflection wavelength ranges of the first and second dichroic optical multilayered films 4 and 6 can have only features (1) to (4) described above. In this sense, the numerical values of the reflection wavelength ranges are not limited to the ones shown in FIGS. 5A and 5B.

Two samples of dichroic optical multilayered film of the present embodiment will be described. In these samples, it is assumed that prisms are made of glass (BK7) and an incident angle of an incident light is 45°.

Figure 12A:
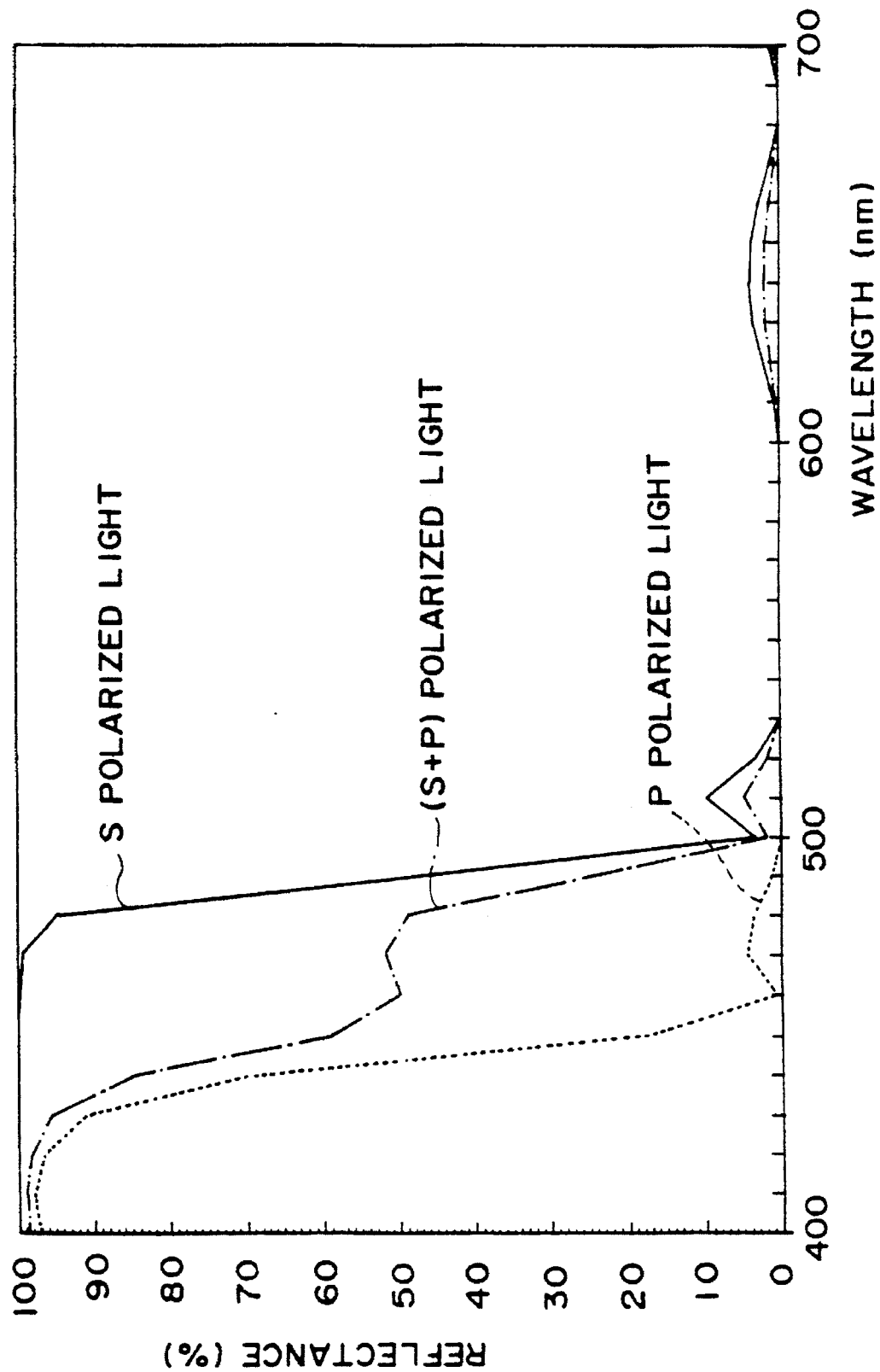
FIG. 12A is a graph showing the dependency of spectral reflectance of blue reflecting multilayered film upon poralized light.

The first example is a blue reflecting optical multilayered film comprising a high-index film H of ZnS and a low-index film L of $Al_2O_3$. The high index film has an effective thickness H of 120 nm, and the low-index film has an effective thickness L of 120 nm. These may be film arrangement of H/2-L-H-L-H-L-H-L-H-L-H-L-H-L-H-L-H-L-H/2 in the order from a substrate (prism) end. FIG. 12A is a graph showing spectral reflectance of P-polarized light, spectral reflectance of S-polariged light and an average of the above two spectral reflectances in reference to the blue reflecting optical multilayered film.

Figure 12B:
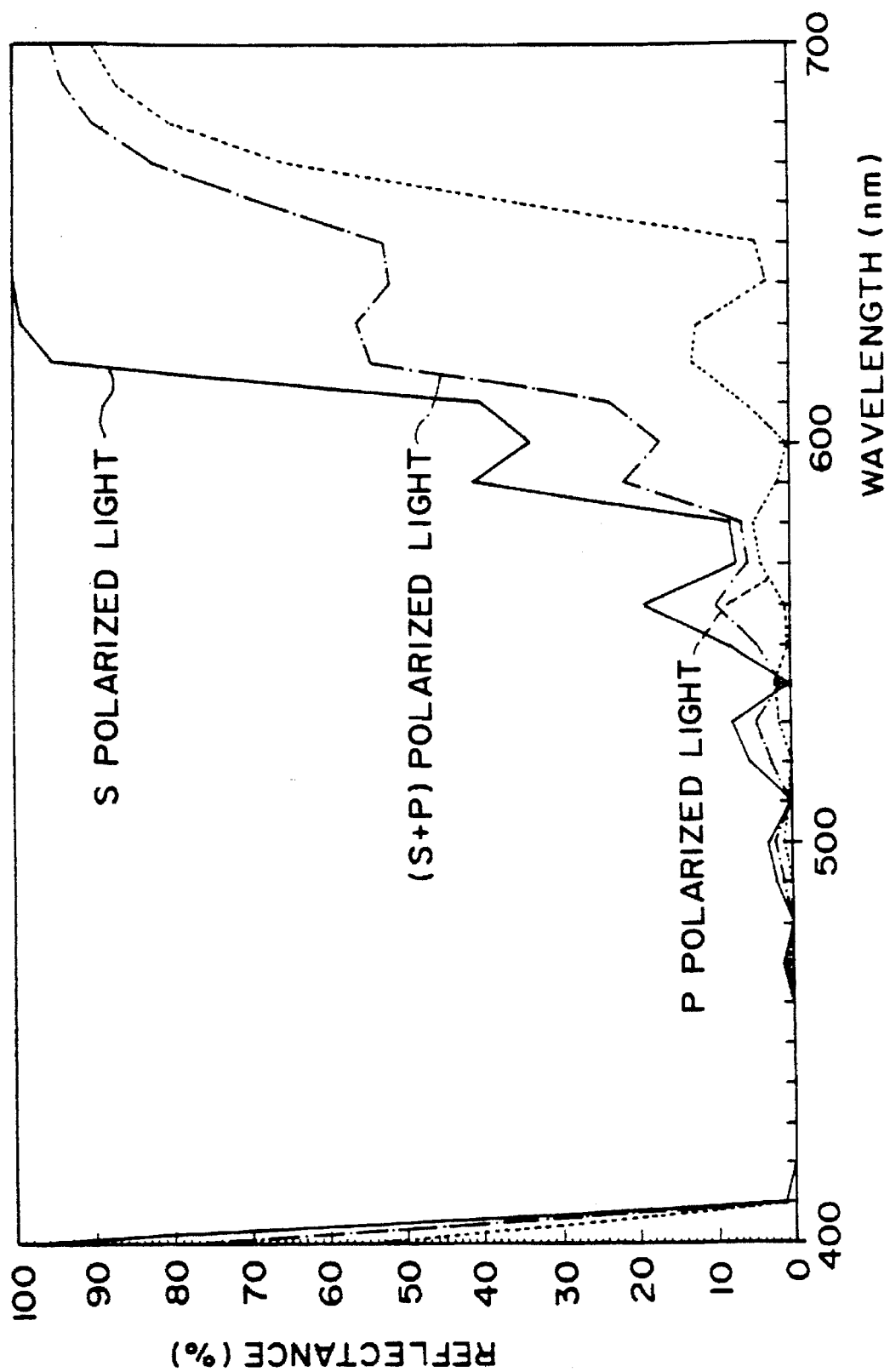
FIG. 12B is a graph showing the dependency of spectral reflectance of red reflecting multilayered film upon poralized light.

The second example is a red reflecting optical multilayered film comprising a high-index film H of ZnS and a low-index film L of $Al_2O_3$. The high-index film has an effective thickness H of 220 nm, and the low-index film has an effective thickness L of 220 nm. There may be film arrangement of L/2-H-L-H-L-H-L-H-L-H-L-H-L-H-L-H-L-H-L/2 in the order from a substrate (prism) end. FIG. 12B is a graph showing spectral reflectance of P-polarized light, spectral reflectance of S-polarized light and an average of the above two spectral reflectances in reference to the red reflecting optical multilayered film.

In addition, the effective thickness is represented by nd/cos θ (n: index of each layer, d: geometric thickness, θ: index angle in each layer).

Each of the first and second halfwave plates 5 and 7 can be formed by a thinly cleaved mica plate, a rolled birefringence film, a low-molecular liquid crystal aligned and sandwiched between thin aligned electrodes, or a high-molecular liquid crystal which is aligned by an external electric field or an aligning force of a substrate at a high temperature and has a stable birefringence at a low temperature. In particular, the rolled film and the high-molecular liquid crystal have large birefringence and therefore have a sufficient effect even if they are thin. When a thin wavelength plate is obtained and is used for image light color separation/synthesis as in a projection display apparatus using such materials, production of a double image can be minimized.

The following three modifications of this embodiment can be exemplified.

The high- and low-index axes of the first and second halfwave plates 5 and 7 have opposite directions. Then, phase errors of the transmitted light beams from the center wavelengths of the first and second halfwave plates 5 and 7 can be compensated.

The order of the layer structure (FIG. 4) of the pair of dichroic mirrors formed at the bonding surface 3 of the first and second rectangular prisms 1 and 2 is reversed. In this case, since the dichroic mirror surfaces have the same function as in the embodiment, the same effect as in the embodiment can be obtained.

In this embodiment, the dichroic mirror surface is formed at the bonding surface 3 of the first and second rectangular prisms 1 and 2. However, the angle of light incident on the prism, and the angles of light incident on the dichroic optical multilayered films 4 and 6 are not limited to the ones exemplified in the above embodiment. The film structures of the dichroic optical multilayered films 4 and 6 can be designed in accordance with incident angles. Two prisms having a shape different from that of the rectangular prisms 1 and 2 may be used.

Figure 6:
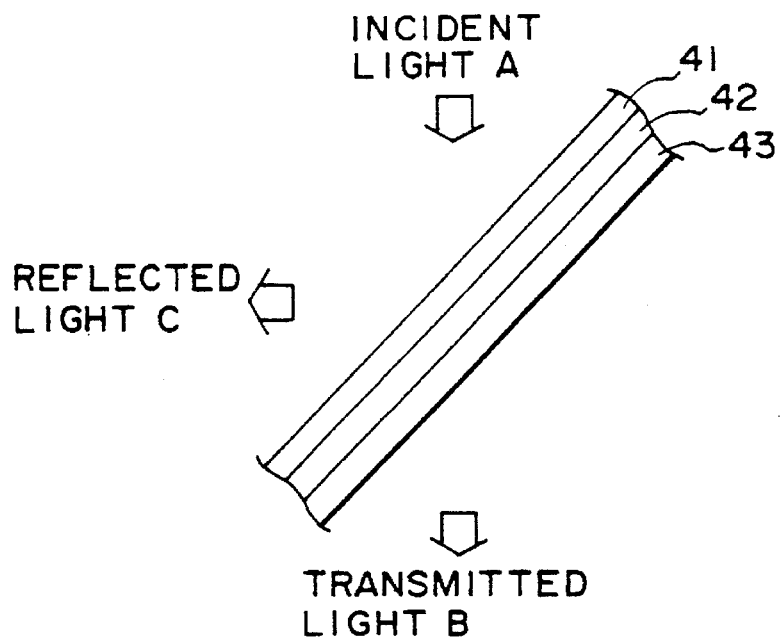
FIG. 6 is a view showing a structure of a dichroic mirror surface used in the second embodiment of a dichroic mirror according to the present invention.

FIG. 6 is a view showing a structure of dichroic mirror surfaces used in the second embodiment of the dichroic mirror according to the present invention.

This dichroic mirror is also generally called a dichroic prism (to be referred to as a dichroic prism hereinafter) as in FIG. 3. Two 45° rectangular prisms are bonded to each other and a dichroic mirror surface is formed at the bonding surface. As shown in FIG. 6, however, the dichroic mirror surface of the dichroic prism is formed such that first and second dichroic optical multilayered films 41 and 43 sandwich a first halfwave plate 42. This dichroic mirror in FIG. 6 is different from that in FIG. 3 in that the second halfwave plate 7 is omitted.

In the dichroic prism shown in FIG. 3, the second halfwave plate 7 adhered to the surface of the second dichroic optical multilayered film 6 which opposes the first halfwave plate 5 is so arranged that the polarization plane of the transmitted light B passing through the dichroic prism is set equal to that of the incident light A. Even if a three-layered structure is obtained by omitting the second halfwave plate 7, the ratio of the transmitted light to the reflected light in each wavelength region is kept unchanged to obtain the same effect as the first embodiment of the dichroic mirror.

As a modification of this dichroic prism, the angle of light incident on the prism and the angles of light incident on the first and second dichroic optical multilayered films 41 and 43 are changed to design the film structures of the first and second dichroic optical multilayered films 41 and 43 in accordance with incident angles.

The dichroic prism shown in each of FIGS. 3 and 6 reflects the blue beam. However, dichroic prisms for reflecting red and green beams may be equally arranged.

In red light reflection, the reflection characteristics of the first dichroic optical multilayered film in the short-wavelength edge range of the red light range as a predetermined visible range must be set equal to those of the second dichroic optical multilayered film. In green light reflection, the reflection characteristics of the first dichroic optical multilayered film in both the long- and short-wavelength edge regions of the green light range as a predetermined visible range must be set equal to those of the second dichroic optical multilayered film. Therefore, the wavelength ranges of the respective color beams can be clearly separated from each other.

In blue and red light reflection, the reflection characteristics of the first dichroic optical multilayered film for the S-polarized component in the edge wavelength ranges (short- and long-wavelength ends) of the blue and red light ranges can be set equal to those of the second dichroic optical multilayered film.

Figure 7:
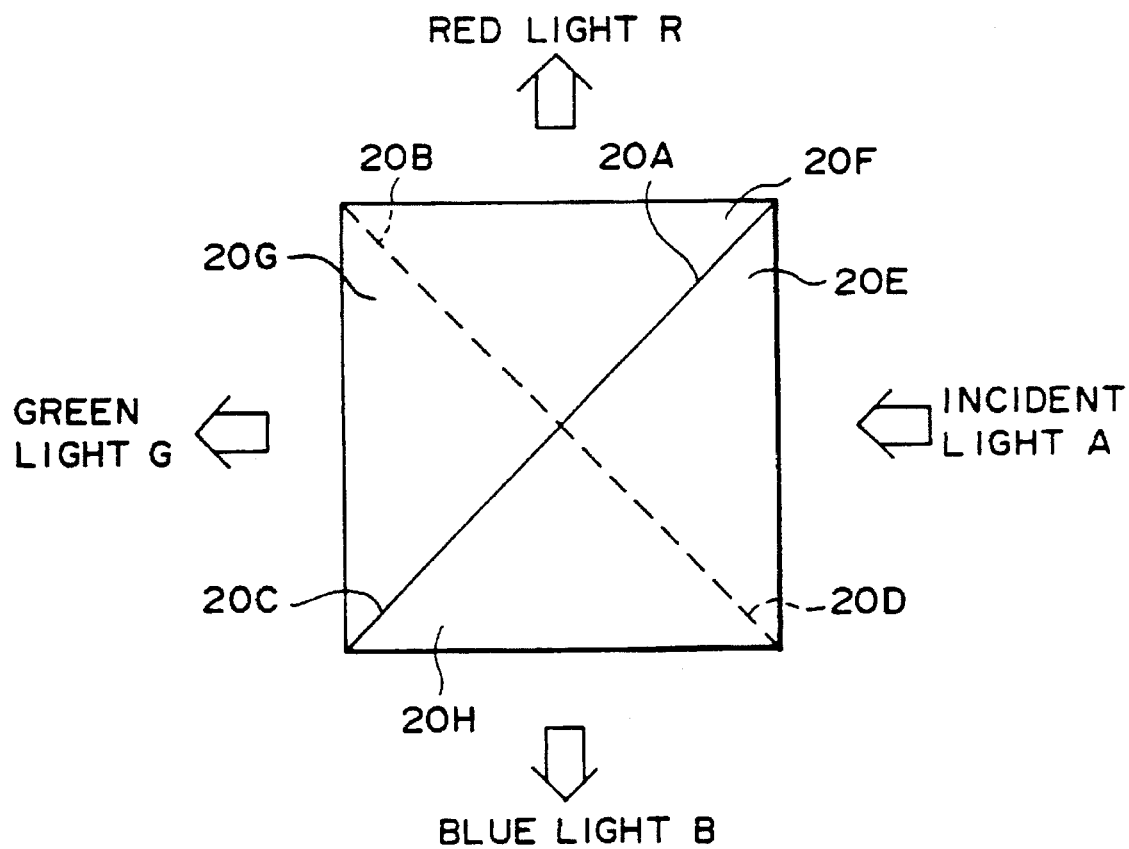
FIG. 7 is a schematic view of a dichroic mirror according to the third embodiment of the present invention.

FIG. 7 is a schematic view showing the third embodiment of a dichroic mirror according to the present invention.

This dichroic mirror is generally called a crossed dichroic prism (to be referred to as a crossed dichroic prism hereinafter). As in a known crossed dichroic prism, four 45° rectangular prisms 20E to 20H are bonded to each other in the counterclockwise direction such that their 90° vertices constitute the center of the crossed dichroic prism (FIG. 7).

This crossed dichroic prism is different from the known crossed dichroic prism in that dichroic mirror surfaces 20A to 20D formed at the bonding surfaces of the four rectangular prisms 20E to 20H have the same structure shown in FIG. 4.

Each of the first dichroic mirror surface 20A (indicated by the solid line in FIG. 7) formed at the bonding surface between the first rectangular prism 20E and the second rectangular prism 20F and the third dichroic mirror surface 20C (indicated by the solid line in FIG. 7) formed at the bonding surface of the third rectangular prism 20G and the fourth rectangular prism 20H comprises a first dichroic optical multilayered film, a first halfwave plate, a second dichroic optical multilayered film, and a second halfwave plate, all of which are stacked from the light incident side. The first and second dichroic optical multilayered films have the reflection characteristics shown in FIGS. 5A and 5B, respectively. Of all the components of the white light as the incident light A incident from the right side in FIG. 7, each dichroic optical multilayered film reflects a blue light beam and transmits green and red light beams.

Each of the second dichroic mirror surface 20B (indicated by the broken line in FIG. 7) formed at the bonding surface of the second rectangular prism 20F and the third rectangular prism 20G and the fourth dichroic mirror surface 20D (indicated by the broken line in FIG. 7) formed at the bonding surface between the fourth rectangular prism 20H and the first rectangular prism 20E comprises a first dichroic optical multilayered film, a first halfwave plate, a second dichroic optical multilayered film, and a second halfwave plate, all of which are stacked from the light incident side. Each of the first and second dichroic optical multilayered films has reflection characteristics for reflecting the red beam, so that the red beam of all the components of the white light is reflected, and the blue and green beams are transmitted.

When white light as incident light A is incident on this crossed dichroic prism, a blue light beam of the white light incident on the upper half of the structure is reflected by the first dichroic mirror surface 20A perpendicularly downward in FIG. 7, and the red light beam of the white light is transmitted through the first dichroic mirror surface 20A and is reflected by the second dichroic mirror surface 20B perpendicularly upward in FIG. 7. A red light beam of the white light incident on the lower half of the structure is reflected by the fourth dichroic mirror surface 20D perpendicularly upward, and a blue light beam of the white light passes through the fourth dichroic mirror surface 20D and is reflected by the third dichroic mirror surface 20C perpendicularly downward in FIG. 7. A green light beam of the white light passes through the first to fourth dichroic mirror surfaces 20A to 20D to color-separate the white light.

On the other hand, when the red, green, and blue light beams are incident on the dichroic mirror downward, righthand, and upward, respectively, the red light beam is reflected by the second and fourth dichroic mirror surfaces 20B and 20D perpendicularly to the left in FIG. 7. The green light beam passes through the first to fourth dichroic mirror surfaces 20A to 20D. The blue light beam is reflected by the first and third dichroic mirror surfaces 20A and 20C perpendicularly to the left in FIG. 7. Therefore, the red, green, and blue light beams are synthesized.

In this crossed dichroic prism, since the first to fourth dichroic mirror surfaces 20A to 20D do not have polarization dependency, the utilization efficiency of the white light (incident light A) can be increased.

If each of the first to fourth dichroic mirror surfaces 20A to 20D has a structure in which the first dichroic optical multilayered film, the first halfwave plate, and the second dichroic optical multilayered film are stacked in the order named, as shown in FIG. 6, the same effect as the above embodiment can be obtained.

Figure 8:
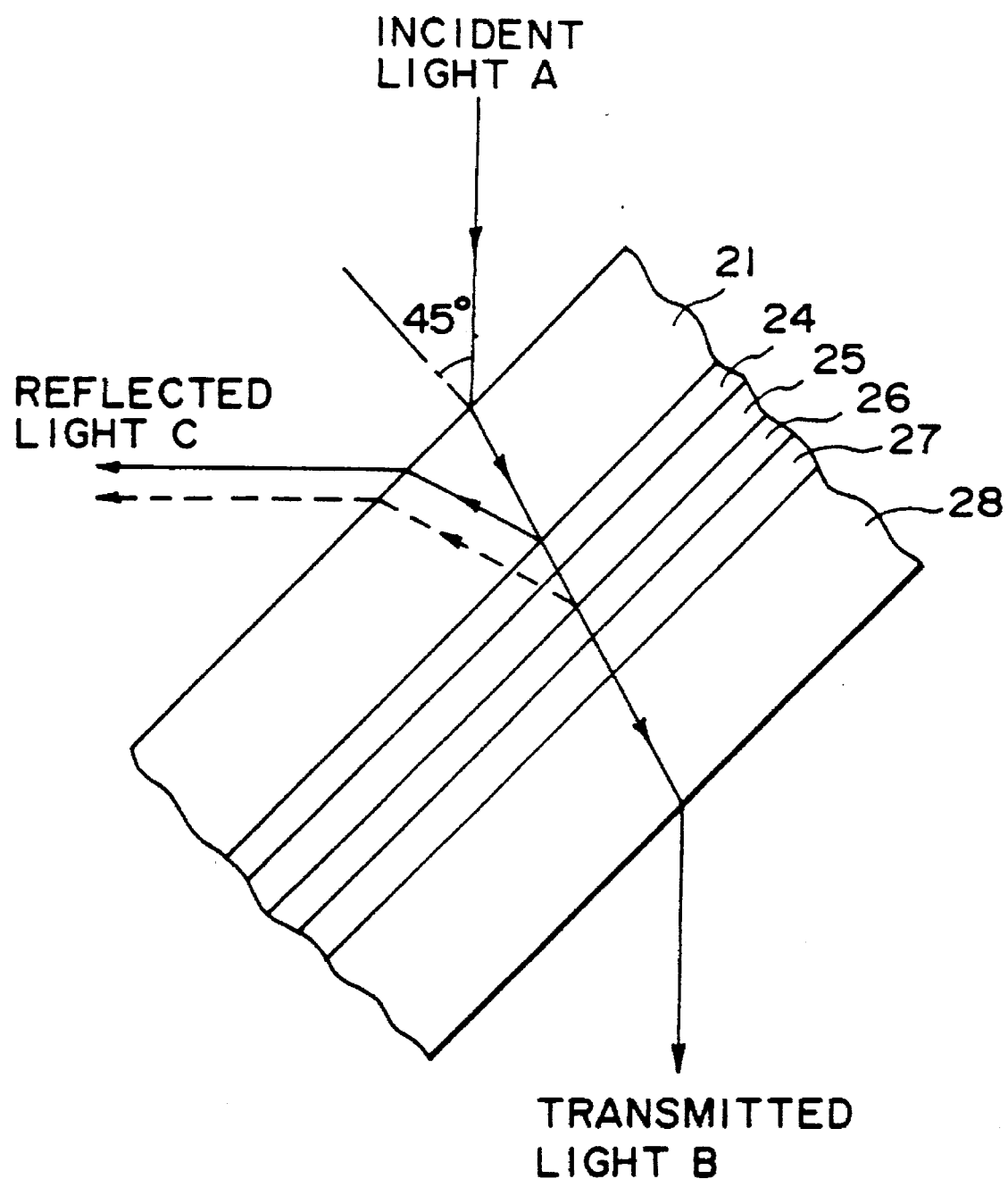
FIG. 8 is a schematic view of a dichroic mirror according to the fourth embodiment of the present invention.

FIG. 8 is a schematic view showing the fourth embodiment of a dichroic mirror according to the present invention.

In this dichroic mirror, dichroic mirror surfaces each having a structure obtained by stacking a first dichroic optical multilayered film 24, a first halfwave plate 25, a second dichroic optical multilayered film 26, and a second halfwave plate 27 in the order named as shown in FIG. 4 are formed between first and second flat plates 21 and 28 made of transparent glass or the like.

In this dichroic mirror, incident light A incident at 45° on the incident surface of the first flat plate 21 is refracted by the incident surface of the first flat plate 21. The incident light is, therefore, incident at angles smaller than the angle of 45° on the first dichroic optical multilayered film 24, the first halfwave plate 25, the second dichroic optical multilayered film 26, and the second halfwave plate 27.

When the first dichroic optical multilayered film 24, the first halfwave plate 25, the second dichroic optical multilayered film 26, and the second halfwave plate 27 are designed in accordance with the corresponding incident angles, the incident light A (blue light beam) incident downward can be reflected by the first dichroic optical multilayered film 24 and output as reflected light C to the left from the incident surface of the first flat plate 21, as indicated by the solid line in FIG. 8. At the same time, as indicated by the broken line, a long-wavelength P-polarized component of the incident light A (blue light beam) passing through the first dichroic optical multilayered film 24 is converted into an S-polarized component by the first halfwave plate 25 and is reflected by the second dichroic optical multilayered film 26. The reflected component emerges as the reflected light C to the left from the incident surface of the first flat plate 21. Therefore, the same effect as in the dichroic prism shown in FIG. 3 can be obtained.

In this dichroic mirror, a light beam not emerging as the reflected light C of the incident light A similarly passes through the first dichroic optical multilayered film 24, the first halfwave plate 25, the second dichroic optical multilayered film 26, and the second halfwave plate 27 and emerges from the second flat plate 22 as the transmitted light B having the same polarization plane as that of the incident light A in the same direction as that of the incident light A.

The following modifications of this embodiment of the dichroic mirror are exemplified as follows.

A dichroic mirror surface having a structure in which a first dichroic optical multilayered film, a first halfwave plate, and a second dichroic optical multilayered film as in FIG. 6 is formed between first and second flat plates 21 and 22.

A dichroic mirror surface having the same structure as shown in FIG. 4 or 6 is formed between two flat plates having wedge-shaped tapers or between a prism and a flat plate.

One of the first and second dichroic optical multilayered films is exposed to an air layer.

In these modifications, since the first dichroic optical multilayered film, the first halfwave plate, the second dichroic optical multilayered film, and the second halfwave plate are designed in accordance with incident angles of the incident light beams, the same effect as the above embodiment of the dichroic mirror can be obtained.

FIGS. 9 and 10 are a plan view and a side view, respectively, showing the first embodiment of a projection display apparatus.

This projection display apparatus comprises a light source unit 50, a crossed dichroic prism 56, a reflecting mirror 57, a polarizing beam splitter 58, and a projection lens 59. The light source unit 50 comprises a reflecting mirror 51, a light source 52, a heat-wave cut filter 53, and a condenser lens 54. The crossed dichroic prism 56 has red, green, and blue reflection liquid crystal light bulbs 55R, 55G, and 55B having the same function as the reflection liquid crystal panel shown in FIG. 1. These light bulbs 55R, 55G, and 55B are formed on three side surfaces of the crossed dichroic prism 56, respectively. The reflecting mirror 57 reflects white light from the light source unit 50 perpendicularly downward in FIG. 10. The polarizing beam splitter 58 has a surface having a function of reflecting an S-polarized component of the white light reflected by the reflecting mirror 57, perpendicularly to the left in FIG. 10 and guiding it to the crossed dichroic prism 56, and at the same time a function of transmitting a P-polarized component of the white light. The projection lens 59 is arranged on a side (right side) opposite to the crossed dichroic prism 56 through the polarizing beam splitter 58.

The crossed dichroic prism 56 has the same structure as that shown in FIG. 7. As shown in FIG. 9, a surface corresponding to the hypotenuse of a first 45° rectangular prism 56E serves as an incident surface of the white light reflected by the polarizing beam splitter 58. The red, green, and blue reflection liquid crystal light bulbs 55R, 55G, and 55B are respectively bonded to the surfaces corresponding to the hypotenuses of second, third, and fourth 45° rectangular prisms 56F, 56G, and 56H.

Each of first and fourth dichroic mirror surfaces 56A and 56D has first and second dichroic optical multilayered films having reflection characteristics shown in FIGS. 5A and 5B. respectively. Of all the components of the white light incident on the crossed dichroic prism 56, the blue beam is reflected and is incident on the blue reflection liquid crystal light bulb 55B.

Each of second and third dichroic mirror surfaces 56B and 56C has first and second optical multilayered films having red reflection characteristics described above. Of all the components of the white light incident on the crossed dichroic prism 56, the red beam is reflected and is incident on the red reflection liquid crystal light bulb 55R.

An operation of this projection display apparatus will be described below.

White light (white parallel light) output from the light source unit 50 is totally reflected by the reflecting mirror 56 perpendicularly downward in FIG. 10 and is incident on the polarizing beam splitter 58. The S-polarized component of the white light which has a polarization plane parallel to the surface of the polarizing beam splitter 58 is reflected by the surface perpendicularly to the left in FIG. 9 and is incident on the crossed dichroic prism 56. This component is used as an image light beam. On the other hand, the P-polarized component of the white light which has a polarization plane not parallel to the surface of the polarizing beam splitter 58 is transmitted through this surface and does not serve as an image light beam. Therefore, at this time, the polarizing beam splitter 58 operates as a polarizer.

The S-polarized component of the white light incident on the crossed dichroic prism 56 becomes a P-polarized component for the dichroic mirror surfaces 56A to 56D of the crossed dichroic prism 56. The P-polarized component is separated into red, green, and blue light beams by the crossed dichroic prism 56 having the dichroic mirror surfaces 56A to 56D having no polarization dependency as described above. The red, green, and blue light beams are respectively incident on the red, green, and blue reflection liquid crystal light bulbs 55R, 55G, and 55B.

A liquid crystal used in each of the reflection liquid crystal light bulbs 55R, 55G, and 55B is of an ECB (Electrically Controlled Birefringence) or 45° TN (45° Twisted Nematic) type. When a voltage applied to the liquid crystal is controlled in accordance with each color image signal, the polarization plane for the incident light can be partially rotated. The light beams of the respective colors incident on the reflection liquid crystal light bulbs 55R, 55G, and 55B are converted into image light beams of the respective colors having P- and S-polarized components in accordance with the pixel signals of the image signal. The image light beams of the respective colors emerge from the reflection liquid crystal light bulbs 55R, 55G, and 55B, respectively.

The image light beams of the respective colors are synthesized by the crossed dichroic prism 56, and a composite light beam is returned to the polarizing beam splitter 58. At this time, the polarizing beam splitter 58 operates as an analyzer. The S-polarized components (i.e., the P-polarized components acting on the surface of the polarizing beam splitter 58) of the composite light beam are transmitted. The composite light beam is then projected on a screen (not shown) as a composite image light beam through the projection lens 59. On the other hand, the P-polarized components (i.e., the S-polarized components acting on the surface of the polarizing beam splitter 58) of the composite image light beam are reflected perpendicularly upward in FIG. 10. The reflected beam is returned to the light source unit 50 through the reflecting mirror 57.

In this projection display apparatus, therefore, the crossed dichroic prism 56 having no polarization dependency, as described above, is used as a color separating/synthesizing means to color-separate and color-synthesize the white light emitted from the light source unit 50. The image light beams of the respective colors are not lost, a flare, a ghost, and a decrease in contrast level upon incidence of each color light beam on a wrong reflection liquid crystal light bulb can be prevented, and a clear image can be obtained. At the same time, as in a projection display apparatus using a conventional crossed dichroic prism, the distance (back focal length) between the projection lens 59 and each of the reflection liquid crystal light bulbs 55R, 55G, and 55B can be shortened.

Figure 11:
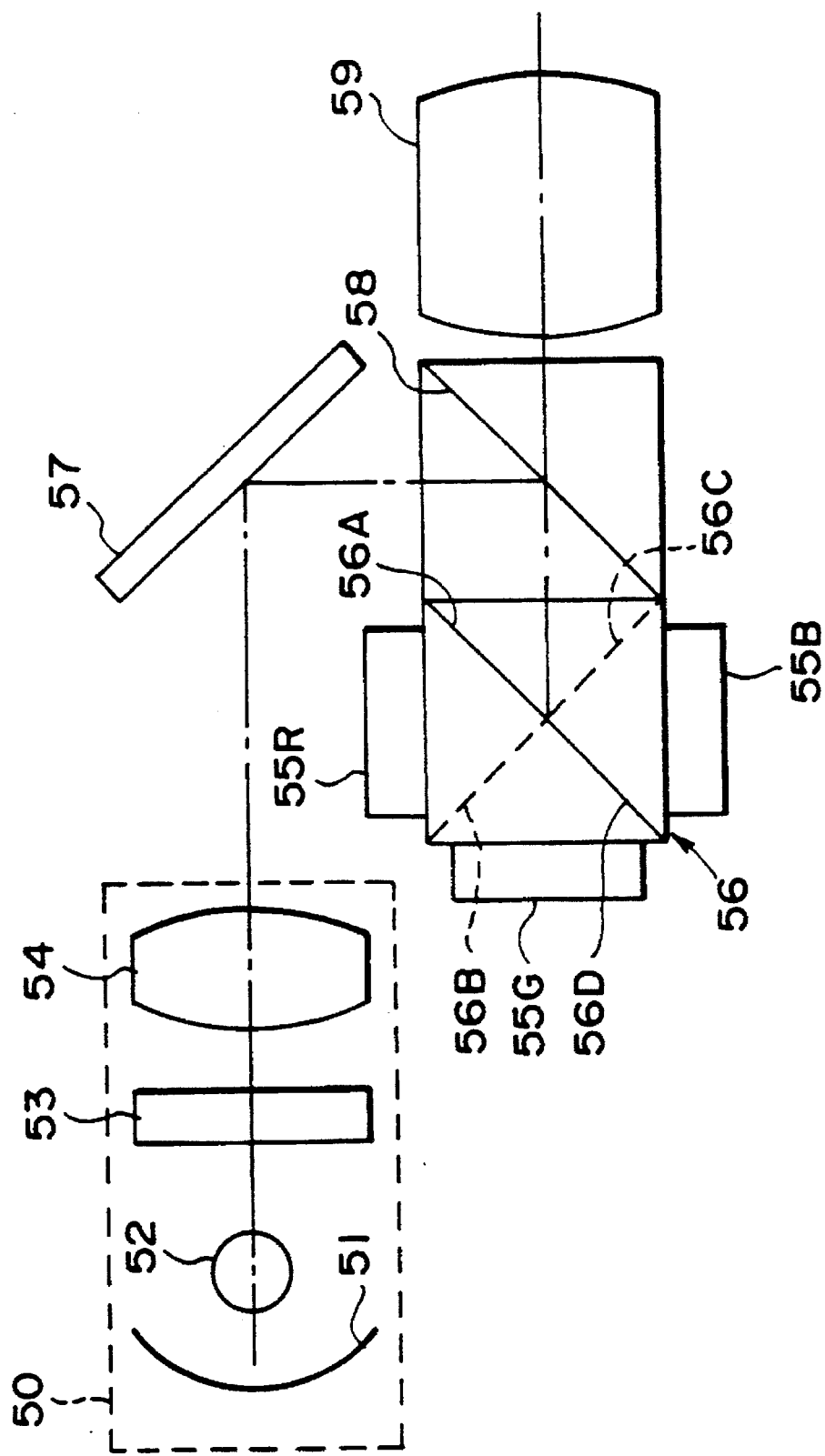
FIG. 11 is a side view showing the second embodiment of a projection display apparatus.

FIG. 11 is a side view showing the second embodiment of a projection display apparatus according to the present invention.

This projection display apparatus is different from that of FIGS. 9 and 10 in that a crossed dichroic prism 56 stands upright at 90° so that a linearly polarized beam (P- or S-polarized component) incident on the surface of a polarizing beam splitter 58 serves as the polarized components incident on the dichroic mirror surfaces 56A to 56D of the crossed dichroic prism 56 in the same direction.

In this projection display apparatus, white light emitted from a light source unit 50 and incident on the crossed dichroic prism 56 through a reflecting mirror 57 and the polarizing beam splitter 58 becomes an S-polarized component for the dichroic mirror surfaces 56A to 56D of the crossed dichroic prism 56. This S-polarized component is color-separated into red, green, and blue light beams by the crossed dichroic prism 56. The red, green, and blue light beams are respectively incident on red, green, and blue reflection liquid crystal light bulbs 55R, 55G, and 55B. Image light beams of the respective colors emerging from the reflection liquid crystal light bulbs 55R, 55G, and 55B may include P-polarized components depending on the image signal. These P-polarized components are not lost through the crossed dichroic prism 56 and are returned to the polarizing beam splitter 58. The projection display apparatus of FIG. 11 has the same effect as in FIGS. 9 and 10.

In each projection display apparatus shown in FIGS. 9 and 10 or FIG. 11, the crossed dichroic prism 56 comprises the one having the dichroic mirror surfaces having the structure shown in FIG. 4. However, a dichroic prism may have dichroic mirror surfaces having the structure shown in FIG. 6 to obtain the same effect as described above.

In this case, each dichroic mirror surface has only one halfwave plate. White light incident on the crossed dichroic prism passes through the halfwave plate at the time of color separation and color synthesis. The polarized components modulated by the respective reflection liquid crystal light bulbs and incident again on the polarizing beam splitter are the same as those described with reference to each projection display apparatus shown in FIGS. 9 and 10 or FIG. 11.

As still another embodiment of a projection display apparatus, in the projection display apparatus shown in FIG. 1, dichroic mirror surfaces having the structure shown in FIG. 4 or 6 may be used in place of first and second dichroic mirror surfaces 84 and 85. Alternatively, in place of the dichroic prism having the first and second dichroic mirror surfaces 84 and 85, two dichroic mirrors shown in FIG. 8 may be used. In such a projection display apparatus, polarization dependency of the dichroic mirror surfaces can be eliminated, and therefore utilization efficiency of light can be improved.

The dichroic mirror described above has dichroic mirrors having no polarization dependency. The P-polarized component, which has not been used in a conventional arrangement because it is transmitted, can be reflected. Therefore, utilization efficiency of light can be further improved.

The S-polarized component reflection characteristics of the first dichroic optical multilayered film in at least one edge wavelength range of a predetermined visible range are equal to those of the second dichroic optical multilayered film. Boundaries of the separated color components can be clearly distinguished from each other, thereby forming a high-performance filter.

When the second halfwave plate is added and the high- and low-index axes of the first and second halfwave plates have opposite directions, exit light components passing through the first and second dichroic optical multilayered films have the same polarization plane as that of the light incident on the dichroic mirror. At the same time, the polarization planes of light components close to the center wavelength can be accurately rotated (180°), and reflection/ separation precision of the exit light components can be further improved.

A crossed dichroic prism is formed by using the dichroic mirror surfaces to perform color separation and color synthesis. The distance (back focal length) between the projection lens and each liquid crystal device can be shortened to increase a degree of design freedom of the projection lens. At the same time, a compact projection display apparatus can be obtained.

A projection display apparatus which performs color separation and color synthesis by using the dichroic mirror described above does not lose image light beams of the respective colors. A flare, a ghost and a decrease in contrast level caused by incidence of each color light beam on a wrong liquid crystal device can be prevented, and a clear image can be obtained.

Since a dichroic mirror according to the present invention is an excellent device almost free from polarization dependency, its application field is not limited to the exemplified projection display apparatuses. For example, the present invention is also applicable to optical equipment having a color separation system and a color synthesis system such as an image pickup apparatus and an image reading apparatus.

When a dichroic mirror according to the present invention is to be applied to a projection color display apparatus, the present invention can be used not only as the reflection display apparatus exemplified herein but also as a transmission display apparatus. In a transmission projection color display apparatus, a dichroic mirror of the present invention is applied to at least one of a color separation system and a color synthesis system.

What is claimed is:

1. A dichroic mirror for reflecting a red beam, comprising:
   a substrate; and
   a multilayered film formed on said substrate, said multilayered film being constituted by a first dichroic reflecting layer, an intermediate layer, and a second dichroic reflecting layer in the order named from the incident side of the red beam, said first dichroic reflecting layer having a smaller reflection range of a P-polarized component of the beam than that of an S-polarized component thereof, said intermediate layer rotating, through substantially 90°, at least part of a beam of the P-polarized component of the beam passing through said first dichroic reflecting layer, said second dichroic reflecting layer having short-wavelength characteristics of the reflection range of the S-polarized component of the red beam to be almost equal to short-wavelength characteristics of the reflection range of the S-polarized component in said first dichroic reflecting layer, and said second dichroic reflecting layer reflecting the at least part of the beam whose polarization plane is rotated by said intermediate layer.

2. A mirror according to claim 1, wherein said intermediate layer comprises a first $\lambda/2$ plate, where $\lambda$ is a wavelength of the at least part of the beam; and said mirror further comprises a second $\lambda/2$ plate formed at a side opposite to said intermediate layer through said second dichroic reflecting layer, said first $\lambda/2$ plate having a high-index axis having a direction substantially the same as that of a low-index axis of said second $\lambda/2$ plate.

3. A mirror according to claim 1, wherein said substrate comprises parallel plates.

4. A mirror according to claim 3, wherein said parallel plates comprise a pair of plates which sandwich said multilayered film.

5. A mirror according to claim 1, wherein said substrate comprises a pair of prisms which sandwich said multilayered film.

6. A dichroic mirror according to claim 1, wherein one of said first and second dichroic reflecting layers is exposed to an air layer.

7. A dichroic mirror for reflecting a blue beam, comprising:
   a substrate; and
   a multilayered film formed on said substrate, said multilayered film being constituted by a first dichroic reflecting layer, an intermediate layer, and a second dichroic reflecting layer in the order named from the incident side of the blue beam, said first dichroic reflecting layer having a smaller reflection range of a P-polarized component of the beam than that of an S-polarized component thereof, said intermediate layer rotating, through substantially 90°, at least part of a beam of the P-polarized component of the beam passing through said first dichroic reflecting layer, said second dichroic reflecting layer having long-wavelength characteristics of the reflection range of the S-polarized component of the blue beam to be almost equal to long-wavelength characteristics of the reflection range of the S-polarized component in said first dichroic reflecting layer, and said second dichroic reflecting layer reflecting the at least part of the beam whose polarization plane is rotated by said intermediate layer.

8. A mirror according to claim 7, wherein said intermediate layer comprises a first $\lambda/2$ plate, where $\lambda$ is a wavelength of the at least part of the beam; and said mirror further comprises a second $\lambda/2$ plate formed at a side opposite to said intermediate layer through said second dichroic reflecting layer, said first $\lambda/2$ plate having a high-index axis having a direction substantially the same as that of a low-index axis of said second $\lambda/2$ plate.

9. A mirror according to claim 7, wherein said substrate comprises parallel plates.

10. A mirror according to claim 9, wherein said parallel plates comprise a pair of plates which sandwich said multilayered film.

11. A mirror according to claim 7, wherein said substrate comprises a pair of prisms which sandwich said multilayered film.

12. A dichroic mirror according to claim 7, wherein one of said first and second dichroic reflecting layers is exposed to an air layer.

13. A dichroic mirror for reflecting a green beam, comprising:
   a substrate; and
   a multilayered film formed on said substrate, said multilayered film being constituted by a first dichroic reflecting layer, an intermediate layer, and a second dichroic reflecting layer in the order named from the incident side of the green beam, said first dichroic reflecting layer having a smaller reflection range of a P-polarized component of the beam than that of an S-polarized component thereof, said intermediate layer rotating, through substantially 90°, at least part of a beam of the P-polarized component of the beam passing through said first dichroic reflecting layer, said second dichroic reflecting layer having long- and short-wavelength characteristics of the reflection range of the S-polarized component of the green beam to be almost equal to long- and short-wavelength characteristics of the reflection range of the S-polarized component in said first dichroic reflecting layer, and said second dichroic reflecting layer reflecting the at least part of the beam whose polarization plane is rotated by said intermediate layer.

14. A mirror according to claim 13, wherein said intermediate layer comprises a first $\lambda/2$ plate, where $\lambda$ is a wavelength of the at least part of the beam; and said mirror further comprises a second $\lambda/2$ plate formed at a side opposite to said intermediate layer through said second dichroic reflecting layer, said first $\lambda/2$ plate having a high-index axis having a direction substantially the same as that of a low-index axis of said second λ/2 plate.

15. A mirror according to claim 13, wherein said substrate comprises parallel plates.

16. A mirror according to claim 15, wherein said parallel plates comprise a pair of plates which sandwich said multilayered film.

17. A mirror according to claim 13, wherein said substrate comprises a pair of prisms which sandwich said multilayered film.

18. A dichroic mirror according to claim 13, wherein one of said first and second dichroic reflecting layers is exposed to an air layer.

19. An optical apparatus having a color separation system, said color separation system receiving first and second beams having different colors, said system comprising a dichroic mirror for reflecting the first beam and transmitting the second beam to separate the first beam from the second beam, said mirror having a first dichroic reflecting layer, an intermediate layer, and a second dichroic reflecting layer in the order named from the incident side of each of the first and second beams, said first dichroic reflecting layer having a smaller reflection range of one of two orthogonal polarized components of the first beam than that of the other of the two orthogonal polarized components, said intermediate layer rotating a polarization plane of at least part of a remaining beam of the one component of the first beam passing through said first dichroic reflecting layer, and said second dichroic reflecting layer reflecting the at least part of the beam whose polarization plane is rotated by said intermediate layer.

20. An apparatus according to claim 19, wherein said second dichroic reflecting layer has characteristics of at least one end of a long- and short-wavelength sides of the reflection range for the other component of the beam similar to those of the reflection range of the other component in said first dichroic reflecting layer.

21. An apparatus according to claim 19, wherein said intermediate layer comprises a halfwave plate for rotating the polarization plane of the at least part of the beam through 90°.

22. An apparatus according to claim 19, wherein said intermediate layer comprises a first halfwave plate for rotating the polarization plane of the at least part of the beam through 90°; and said mirror further comprises a second halfwave plate formed on a side opposite to said intermediate layer through said second dichroic reflecting layer, said first halfwave plate having a high-index axis having a direction substantially the same as that of a low-index axis of said second halfwave plate.

23. An optical apparatus having a color synthesis system, said color synthesis system receiving first and second beams having different colors, said system comprising a dichroic mirror for reflecting the first beam and transmitting the second beam to separate the first beam from the second beam, said mirror having a first dichroic reflecting layer, an intermediate layer, and a second dichroic reflecting layer in the order named from the incident side of each of the first and second beams, said first dichroic reflecting layer having a smaller reflection range of one of two orthogonal polarized components of the first beam than that of the other of the two orthogonal polarized components, said intermediate layer rotating a polarization plane of at least part of a remaining beam of the one component of the first beam passing through said first dichroic reflecting layer, and said second dichroic reflecting layer reflecting the at least part of the beam whose polarization plane is rotated by said intermediate layer.

24. An apparatus according to claim 23, wherein said intermediate layer comprises a halfwave plate for rotating the polarization plane of the at least part of the beam through 90°.

25. An apparatus according to claim 23, wherein said intermediate layer comprises a first halfwave plate for rotating the polarization plane of the at least part of the beam through 90°; and said mirror further comprises a second halfwave plate formed on a side opposite to said intermediate layer through said second dichroic reflecting layer, said first halfwave plate having a high-index axis having a direction substantially the same as that of a low-index axis of said second halfwave plate.

26. A projector comprising:

radiation beam supply means for supplying a radiation beam including first and second beams having different colors;

a color separation system for separating the radiation beam into the first and second beams, said color separation system having a dichroic mirror, said mirror having a first dichroic reflecting layer, an intermediate layer, and a second dichroic reflecting layer in the order named from the incident side of each beam to reflect the first beam and transmit the second beam so as to separate the first beam from the second beam, said first dichroic reflecting layer having a smaller reflection range of one of two orthogonal polarized components of the first beam than that of the other of the two orthogonal polarized components, said intermediate layer rotating a polarization plane of at least part of a remaining beam of the one component of the first beam passing through said first dichroic reflecting layer, and said second dichroic reflecting layer reflecting the at least part of the beam whose polarization plane is rotated by said intermediate layer;

means for modulating the first beam from said color separation system and generating a first image;

means for modulating the second beam from said color separation system and generating a second image; and means for projecting the first and second images.

27. A projector according to claim 26, wherein said intermediate layer comprises a halfwave plate for rotating the polarization plane of the at least part of the beam through 90°.

28. A projector according to claim 26, wherein said intermediate layer comprises a first halfwave plate for rotating the polarization plane of the at least part of the beam through 90°; and said mirror further comprises a second halfwave plate formed on a side opposite to said intermediate layer through said second dichroic reflecting layer, said first halfwave plate having a high-index axis having a direction substantially the same as that of a low-index axis of said second halfwave plate.

29. A projector comprising:

supply means for supplying first and second beams having different colors;

first beam generating means for modulating the first beam from said supply means and generating a beam representing a first image;

second beam generating means for modulating the second beam from said supply means and generating a beam representing the second image;

a color synthesis system for synthesizing the beams representing the first and second images, said system having a dichroic mirror, and said mirror having a first dichroic reflecting layer, an intermediate layer, and a second dichroic reflecting layer in the order named from the incident side of the first beam to reflect the beam representing the first image and transmit the beam representing the second image to synthesize the beam representing the first image with the beam representing the second image, said first dichroic reflecting layer having a smaller reflection range of one of two orthogonal polarized components of the first beam than that of the other of the two orthogonal polarized components, said intermediate layer rotating a polarization plane of at least part of a remaining beam of the one component of the first beam passing through said first dichroic reflecting layer, and said second dichroic reflecting layer reflects the at least part of the beam whose polarization plane is rotated by said intermediate layer; and means for projecting the first and second images by using the beams representing the first and second images from said color synthesis system.

30. A projector according to claim 29, wherein said intermediate layer comprises a halfwave plate for rotating the polarization plane of the at least part of the beam through 90°.

31. A projector according to claim 29, wherein said intermediate layer comprises a first halfwave plate for rotating the polarization plane of the at least part of the beam through 90°; and said mirror further comprises a second halfwave plate formed on a side opposite to said intermediate layer through said second dichroic reflecting layer, said first halfwave plate having a high-index axis having a direction substantially the same as that of a low-index axis of said second halfwave plate.

32. A projector according to claim 29, wherein said supply means includes:

radiation beam supply means for supplying a radiation beam including first and second beams having different colors; and a color separation system for separating the radiation beam into the first and second beams, said color separation system having a dichroic mirror, said mirror having a first dichroic reflecting layer, an intermediate layer, and a second dichroic reflecting layer in the order named from the incident side of each beam to reflect the first beam and transmit the second beam so as to separate the first beam from the second beam, said first dichroic reflecting layer having a smaller reflection range of one of two orthogonal polarized components of the first beam than that of the other of the two orthogonal polarized components, said intermediate layer rotating a polarization plane of at least part of a remaining beam of the one component of the first beam passing through said first dichroic reflecting layer, and said second dichroic reflecting layer reflecting the at least part of the beam whose polarization plane is rotated by said intermediate layer.

33. A projector according to claim 32, wherein said color separation system is used as said color synthesis system.

34. A projector comprising:

radiation beam supply means for supplying a radiation beam including first and second beams having different colors;

a first image generator for reflecting and modulating the first beam and generating a first image;

a second image generator for reflecting and modulating the second beam and generating a second image;

an optical system for separating the radiation beam into the first and second beams and directing the first and second beams toward said first and second image generators, and for synthesizing the first and second beams reflected and modulated by said first and second image generators, said system having a dichroic mirror, and said mirror having a first dichroic reflecting layer, an intermediate layer, and a second dichroic reflecting layer in the order named from the side of said supply means to reflect the first beam and transmit the second beam, said first dichroic reflecting layer having a smaller reflection range of one of two orthogonal polarized components of the first beam than the other of the two orthogonal polarized components, said intermediate layer rotating a polarization plane of at least part of a remaining beam of the one component of the first beam passing through said first dichroic reflecting layer, and said second dichroic reflecting layer reflects the at least part of the beam whose polarization plane is rotated by said intermediate layer; and means for receiving through said optical system the first and second beams reflected and modulated by said first and second image generators and projecting the first and second images by using the first and second beams.

35. A projector according to claim 34, wherein said intermediate layer comprises a halfwave plate for rotating the polarization plane of the at least part of the beam through 90°.

36. A projector according to claim 34, wherein said intermediate layer comprises a first halfwave plate for rotating the polarization plane of the at least part of the beam through 90°; and said projector further comprises a second halfwave plate formed on a side opposite to said intermediate layer through said second dichroic reflecting layer, said first halfwave plate having a high-index axis having a direction substantially the same as that of a low-index axis of said second halfwave plate.

37. A projector according to claim 34, wherein said optical system comprises a crossed dichroic prism having said mirror.

38. A projector according to claim 34, wherein the second beam includes third and fourth beams having colors different from each other and from that of the first beam;

said second image generator comprises a first optical modulator for reflecting and modulating the third beam and forming a third image, and a second optical modulator for reflecting and modulating the fourth beam and forming a fourth image; and said optical means comprises a second dichroic mirror, said second dichroic mirror having a third dichroic reflecting layer, a second intermediate layer, and a fourth dichroic reflecting layer in the order named from the side of said supply means to reflect the third beam and transmit the fourth beam, said third dichroic reflecting layer having a smaller reflection range of one of two orthogonal polarized components of the third beam than that of the other of the two orthogonal polarized components, said second intermediate layer rotating a polarization plane of at least part of a remaining beam of the one component of the third beam passing through said third dichroic reflecting layer, and said fourth dichroic reflecting layer reflecting the at least part of the beam whose polarization plane is rotated by said second intermediate layer.

39. A projector according to claim 34, wherein said first and second image generators partially rotate the polarization planes of the first and second beams to generate the first and second images.

40. A projector according to claim 39, wherein said supply means comprises a radiation source for generating the radiation beam, and a polarizing beam splitter for directing the radiation beam from said radiation source toward said optical system and directing the first and second beams reflected and modulated by said first and second image generators toward said image projecting means through said optical system.

41. A dichroic mirror for reflecting a beam of a given color, said beam having first and second polarized components, and a reflection range for the first polarized component is smaller than that for the second polarized component, said dichroic mirror comprising:

a substrate; and a multilayered film formed on said substrate, said multilayered film being constituted by a first dichroic reflecting layer, an intermediate layer, and a second dichroic reflecting layer in the order named from the beam incident side, said intermediate layer rotating a polarization plane of a part of the first polarized component, passing through said first dichroic reflecting layer, and said second dichroic reflecting layer reflecting the part of the first polarized component whose polarization plane is rotated by said intermediate layer, wherein said intermediate layer comprises a first halfwave plate for rotating the polarization plane of the part of the first polarized component through 90°; and said mirror further comprises a second halfwave plate formed on a side opposite to said intermediate layer by way of said second dichroic reflecting layer, said first halfwave plate having high-index axis having substantially the same direction as that of a low-index axis of said second halfwave plate.

42. A dichroic mirror for reflecting a beam of a color, wherein a reflection range for a first polarized component of said color is smaller than that for a second polarized component of said color, said dichroic mirror comprising:

a substrate; and a multilayered film formed on said substrate, said multilayered film including a first dichroic reflecting layer, a first halfwave plate, a second dichroic reflecting layer and a second halfwave plate in the order named from the beam incident side, said first halfwave plate rotating a polarization plane of a part of the first polarized component, passing through said first dichroic reflecting layer, and said second dichroic reflecting layer reflecting the part of the first polarized component whose polarization plane is rotated by said first halfwave plate, wherein said second halfwave plate has a low index axis having substantially the same direction as that of a high-index axis of said first halfwave plate.

43. A dichroic mirror for reflecting a beam of color, wherein a reflection range for a first polarized component of said color is smaller than that for a second polarized component of said color, said dichroic mirror comprising:

a substrate; and a multilayered film formed on said substrate, said multilayered film including a first dichroic reflecting layer, a first halfwave plate, a second dichroic reflecting layer and a second halfwave plate in the order named from the beam incident side, said first halfwave plate rotating a polarization plane of a part of the first polarized component, passing through said first dichroic reflecting layer, said second dichroic reflecting layer reflecting the part of the first polarized component whose polarization plane is rotated by said first halfwave plate, and said second halfwave plate rotating a polarization plane of a beam of other color which is passed through said first dichroic reflecting layer, said first halfwave plate and said second dichroic reflecting layer.

44. A dichroic mirror for reflecting a beam of a given color, including:

a substrate; and a multilayered film formed on said substrate, said multilayered film having a first dichroic reflecting layer, an intermediate layer, a second dichroic reflecting layer and an auxiliary layer in the order named from the beam incident side, said first dichroic reflecting layer having a smaller reflection range for one of two orthogonal polarized components of the beam than a reflection range for the other of the two orthogonal polarized components, said intermediate layer rotating a polarization plane of at least part of a beam of the one component of the beam passing through said first dichroic reflecting layer, said second dichroic reflecting layer reflecting the at least part of the beam whose polarization plane has been rotated by said intermediate layer, and said auxiliary layer having a low refractive index axis parallel to a high refractive index axis of said intermediate layer.

\* \* \* \* \*